April 11, 1961 P. A. LIRIO 2,979,291
INFLATABLE PONTOON FOR AIRCRAFT
Filed July 25, 1957 3 Sheets-Sheet 1
Fig. 1.
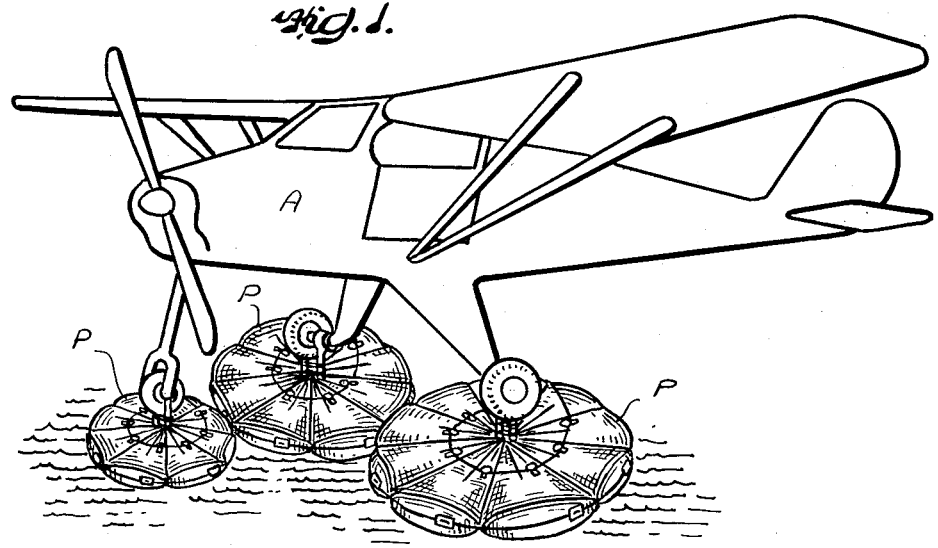
Fig. 2.
Fig. 3.
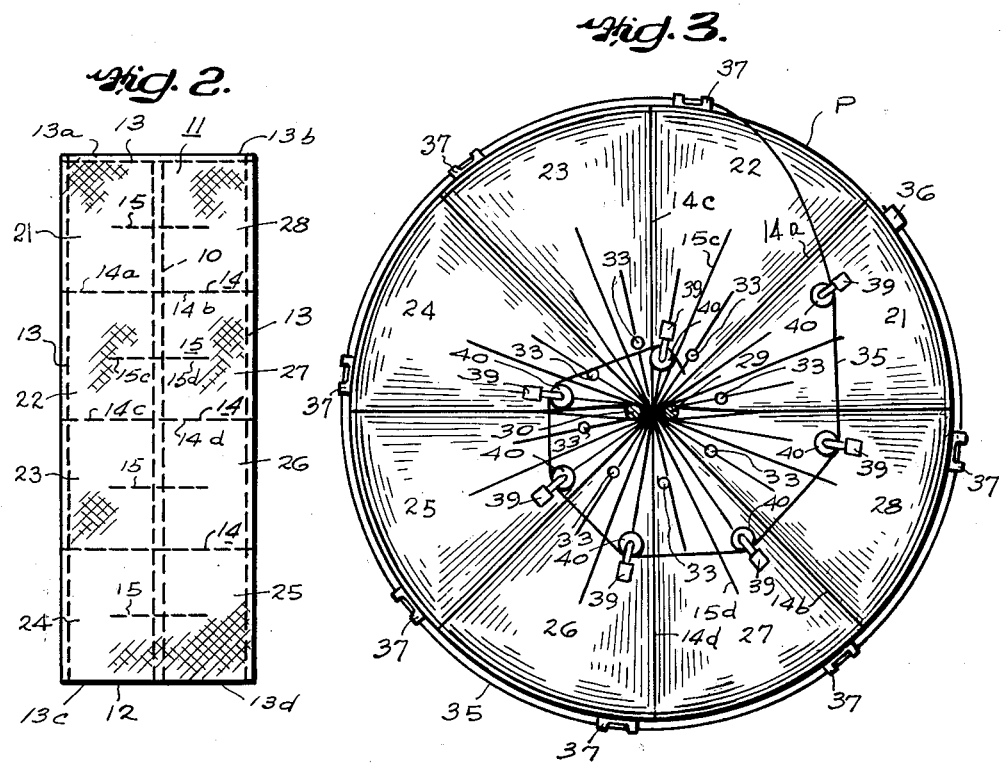
INVENTOR.
PHILIP A. LIRIO
BY
ATTORNEY

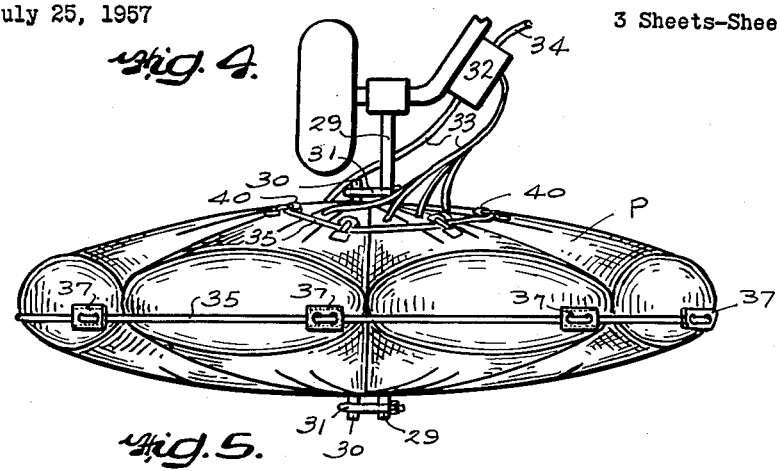
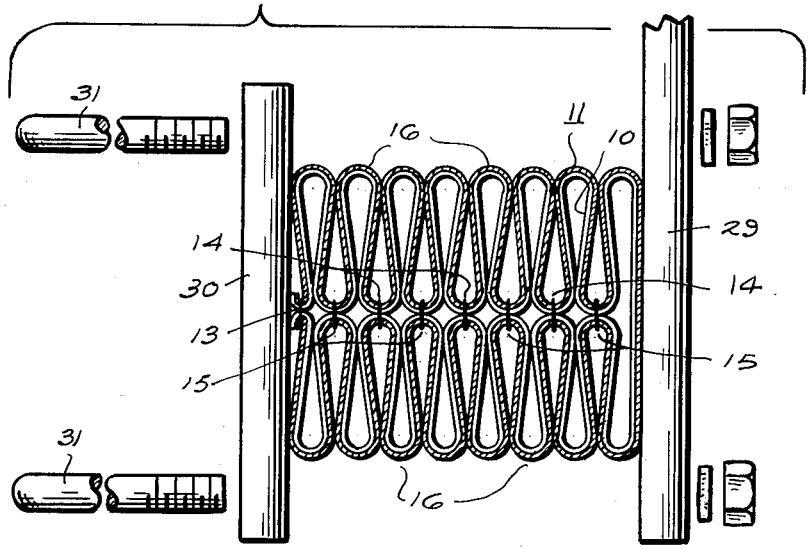
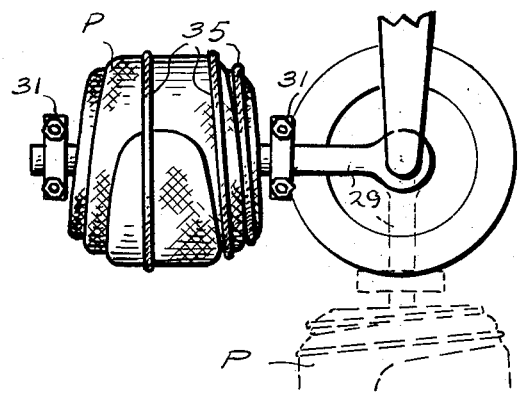

April 11, 1961 P. A. LIRIO 2,979,291
INFLATABLE PONTOON FOR AIRCRAFT
Filed July 25, 1957 3 Sheets-Sheet 3
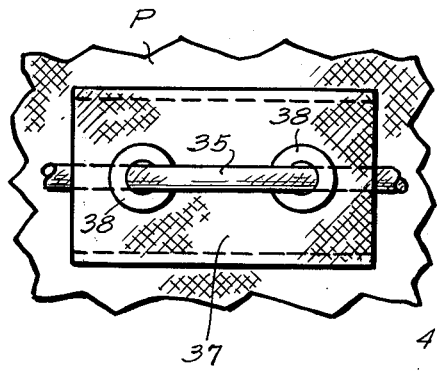
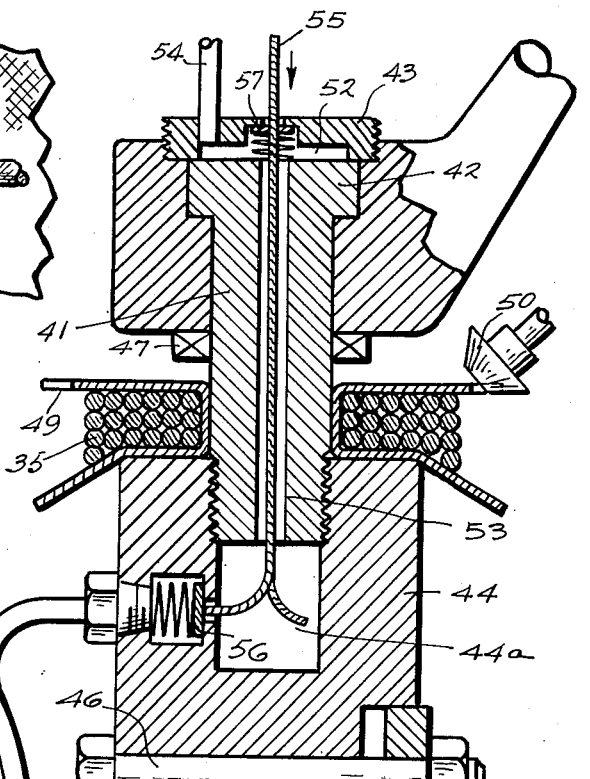
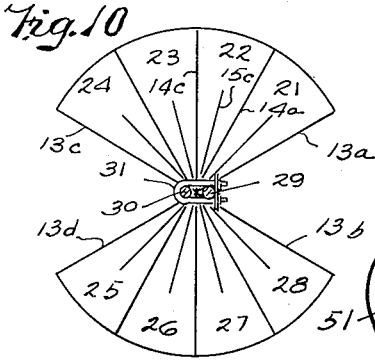
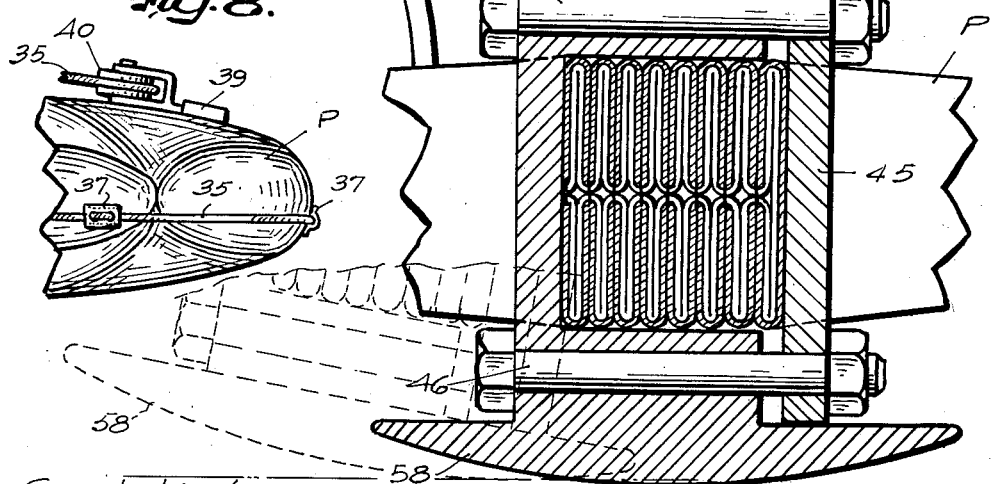
INVENTOR
PHILIP A. LIRIO
BY Leon Edelson
ATTORNEY

United States Patent Office 2,979,291
Patented Apr. 11, 1961

2,979,291

INFLATABLE PONTOON FOR AIRCRAFT

Philip A. Lirio, Vineland, N.J., assignor to Lirio Chemical Company, Inc., Vineland, N.J., a corporation of New Jersey Filed July 25, 1957, Ser. No. 674,147

12 Claims. (Cl. 244—102)

This invention relates generally to landing gear for airborne vehicles and particularly to pneumatic devices adapted for supporting the vehicle by their buoyancy in the case of alighting upon water.

An important object of the present invention is to provide an improved form of multi-compartment inflatable landing gear for use in aircraft.

Another important object of the present invention is to provide improved means for mounting compartmented inflatable float structures upon the average commercially-built plane.

Still another important object of the present invention is to provide compartmented inflatable float structures and pilot controlled means for inflating and deflating and otherwise controlling the structures aforesaid in flight.

And still another important object of the present invention is to provide compartmented float structures that are simple in design, rugged in construction and economical to manufacture.

Other objects and advantages of the present invention will appear more fully hereinafter, it being understood that the present invention consists substantially in the combination, construction, location and relative arrangement of parts, all as will appear more fully hereinafter, as shown in the accompanying drawings and as finally pointed out in the appended claims.

In the accompanying drawings:

Figure 1 is a perspective view of an airplane equipped with pontoons constructed in accordance with and embodying the principles of the present invention.

Figure 2 is a plan view of the fabric of a pontoon folded and sewn to form a flat multisection closed envelop.

Figure 3 is a plan view of a fully inflated pontoon.

Figure 4 is an elevation of the pontoon shown in Figure 3.

Figure 5 is an exploded view of a pontoon mounting clamp and the pontoon fabric intervening the parts of the clamp.

Figure 6 is a view of a deflated and retracted pontoon, broken lines being utilized to show the pontoon deflated but not retracted.

Figures 7 and 8 are enlarged views showing guide means for the pontoon deflating cable.

Figure 9 is a vertical section showing a modified form of the pontoon mounting structure prior to landing, broken lines being utilized to show the same after landing on the ground.

Figure 10 is a plan view of the fabric of a pontoon in an intermediate stage of its formation.

Referring to the drawings, and particularly to Figure 1, an airplane A is equipped with a set of three pneumatic devices each in the form of a compartmented inflatable float structure or pontoon P that is constructed in accordance with and which embodies the principles of the present invention. However, it will be understood that the present invention is not limited to the application of a specific number of pontoons to an airplane or to the application of pontoons to any specific type of airplane.

Referring particularly to Figure 2, the main body of a pontoon P may be constructed in accordance with the following preferred procedure: A narrow strip 10 of suitable material, for example, sheet rubber, is adhesively or otherwise secured to a rectangular sheet 11 of main body material, for example, canvas or nylon, that has been treated to render the same water repellent. The strip 10 extends the full length of the sheet 11 and is placed midway between the longitudinally extending opposite side edges of the latter. Then, midway between its opposite ends, the sheet 11 is folded upon a line 12, and the two opposite end half sections thereof are disposed in mutually overlying relation, with the strip 10 similarly folded and sandwiched therebetween. These mutually overlying half sections are now sewn together by a peripheral line of stitching 13 that extends about the three open sides thereof to thereby form, conjointly with the fold 12, a closed envelop, three main transversely extending lines of stitching 14 that subdivide the envelop aforesaid into four closed envelops that are equal in size, and four auxiliary transversely extending lines of stitching 15 that extend across the strip 10 and laterally thereof equal distances in opposite directions, terminating at each end a substantial distance short of the stitching 13, as shown.

The unit, folded and sewn in the manner aforesaid, is then gathered along the strip 10 by separating the mutually overlying fabric areas disposed between each successive pair of transversely extending lines of stitching and between each opposite end of the folded and sewn unit and the adjacent one of said lines of stitching. Thus, the fold 12 is opened, and the unit is provided with an upper and a lower series of accordion type pleats 16, as best shown in Figure 5. After clamping the fabric together in this gathered and accordion pleated condition (by means to be described hereinafter) each end of the unit is doubled upon itself to thereby fan out the fabric about the clamp means, as best shown in Figure 10. Then the fabric is sewn or otherwise secured together in the doubled condition aforesaid, i.e., the edges indicated by the numerals 13a and 13b and the edges indicated 13c and 13d are fastened together.

Referring particularly to Figures 3 and 4, the unit thus far described, when inflated, is disc shaped and generally flat in appearance. This unit or pontoon P is provided with eight separate compartments designated respectively by the numerals 21 through 28. The compartment 22, a typical compartment, is defined by the lines of stitching 14a and 14c that extend radially from the clamp means, and by the periphery of the unit. Between the lines of stitching 14a and 14c is the line of stitching 15c, which helps the compartment hold its generally flat shape.

Referring particularly to Figures 4, 5, and 6, the clamping means referred to hereinbefore may comprise a clamp part in the form of a bar 29 that depends from the frame of the airplane adjacent one of the landing wheels, a clamp part in the form of a bar 30 that is positioned in laterally spaced parallel relation to the bar 29, and a pair of U-shaped clamp parts 31—31 that secure the bars 29 and 30 together. The accordion pleated material is sandwiched between the clamp parts 29 and 30, as best shown in Figure 5. With the clamp fully tightened, the mutually overlying portions of the strip 10 firmly engage one another to thereby choke or seal off the compartments 21-28 each from communication with the other compartments.

The procedure just described for forming the pontoon P is merely illustrative, of course, and it will be understood that the pontoon may be formed in other ways. For example, the fabric may be fully formed into a pontoon that has a multiplicity of separate compartments and which can be inflated to the required flat disc shape without the aid of a central mounting post that functions as a clamp as well as a strut. In this case, the central mounting post functions merely as a strut.

Intervening each of the pontoons P and a suitable valve 32 that is preferably mounted upon the frame of the airplane, proximate the clamp that secures the pontoon P to the frame aforesaid, are a set of flexible air lines designated 33, each placing one of the compartments 21–28 in communication with the valve 32. Extending from the valve 32 into the cabin of the airplane is a suitably valved air line 34 that is connected with a source of air under pressure. It will be understood, of course, that means (not shown) is provided for controlling the valve 32 from the cabin of the airplane.

Referring particularly to Figures 3 and 4, for deflating a pontoon P, a flexible cable 35 is anchored by one end thereof to a point 36 on the periphery and just below the horizontal median plane of the pontoon P. From this anchor point 36 the cable 35 extends close to 360 degrees about the pontoon P and then spirals over the top thereof to the clamp that secures the pontoon P to the frame of the airplane, as shown. Then the cable 35 extends upwardly from the pontoon P into the cabin of the airplane. Suitably spaced circumferentially about the pontoon P are a plurality of patches of fabric 37, each sewn securely to the pontoon P and fitted with a pair of grommets 38—38 through which the cable 35 is freely threaded for guidance. On the top of the pontoon are a plurality of strips of fabric 39, each being doubled upon itself and sewn securely to the pontoon and serving to anchor a pulley 40 to the pontoon, the cable 35 being threaded freely through the pulley for guidance.

The pontoons may be deflated and retracted while the airplane is in flight. In order to effect this operation, the valves 32 are actuated to thereby place the several compartments of the pontoons P in communication with atmosphere. Then the cables 35 are drawn in to thereby wrap the fabric of the pontoons P about the centrally located pontoon mounting clamps as the air is exhausted from the several compartments aforesaid. Now the clamps, with the pontoons P wrapped thereabout, are swung rearwardly and upwardly about a horizontal axis, by means not shown, to the retracted position indicated in Figure 6.

When it is desired to alight upon water, the deflated and retracted pontoons P are swung downwardly and forwardly again, the cables 35 are released and the valves 32 are actuated to thereby supply air under pressure to the several compartments of the pontoons P. As air enters these compartments, the pontoons expand and unwind themselves from about the clamp structures, fanning out to their initial shape and simultaneously drawing the cable 35 out to its initial extended position.

Referring particularly to Figure 9 wherein modified means for mounting a pontoon P is more or less diagrammatically illustrated, the foot of the strut to which the pontoon is attached is suitably bored for revolubly receiving a member 41 and is suitably counterbored for seating an enlarged head 42 that is formed on the upper end of the member 41. Threaded into the top of this foot is a cap 43 that serves to secure the member 41 against displacement, and threaded upon the lower end of the member 41 and depending therefrom is a clamp part 44. A second clamp part 45 is disposed in laterally spaced parallel relation to the clamp part 44 and is secured thereto by a pair of bolts 46—46. Immediately below the foot of the strut and embracing the member 41 is a conventional brake, generally designated 47, and operatively associated with the latter is a brake operating cable (not shown) that extends upwardly into the cabin of the airplane. Operatively intervening the brake 47 and the clamp member 44 is a reel 49 that is mounted to turn freely about the member 41 and which is operatively associated with a bevel gear 50, operable from the cabin of the airplane for controlling the reel 49.

The accordion pleated fabric of the pontoon P is sandwiched between the clamp parts 44 and 45 and each compartment of the pontoon is placed in communication with a chamber 44a internally of the clamp part 44 by way of a flexible air line 51. The chamber 44a communicates with a space 52 under the cap 43 by way of a central bore 53 that extends through the member 41. This space 52 communicates with a source of air under pressure through an air line 54. Extending through the cap 43 and the member 41 is a semi-rigid valve actuating member 55 the lower end of which member is provided with branches, each of which latter is operatively connected with a check valve 56 that is built into the member 44 and which controls the flow of air through one of the air lines 51.

In order to deflate the pontoon P, the valve actuating member 55 is shifted downwardly, whereupon the check valves 56 all open simultaneously for exhausting air from the several compartments of the pontoon P through the air lines 51 and check valves 56, the chamber 44a and the bore 53, and an exhaust valve 57 that is built into the cap 43 and which is controlled by the member 55. Simultaneously, the bevel gear 50 is actuated for turning the reel 49 in cable retracting direction, whereupon the cable is wound upon the reel 49 and the pontoon fabric is wrapped about the pontoon mounting structure, as described hereinbefore.

In order to reinflate the pontoon P, the bevel gear 50 is released so that the cable 48 can be freely payed out by the reel 49. Then air under pressure is supplied to the several compartments of the pontoon P through the air line 54 and under cap space 52, the bore 53 and chamber 44a, and the several check valves 56 and air lines 51, whereupon the pontoon P expands and unwinds itself from about the pontoon mounting structure, fanning out to its initial shape and simultaneously drawing the cable 35 out from the reel 49 to its initial extended position.

After the airplane has alighted, it may be necessary for the airplane to move over the surface of the water, or even over the surface of the ground, as when it is being beached. To facilitate this movement, the pontoons P are mounted for rotation freely about their supporting structures, i.e., each pontoon P may turn as a unit with its supporting structure comprising the member 41 and the clamp parts 44 and 45. When it is desired to prevent or terminate rotation of a pontoon P, it is necessary merely to operate the associated brake 47. Referring particularly to Figure 9, preferably the lower extremity of the pontoon mounting structure is provided with a disc-like shoe, as at 58. When the airplane is beached, the struts to which the pontoons are attached spread somewhat under the weight of the plane, which weight is transmitted to the ground through the disc-like shoes 58. An under surface area of the latter spaced laterally from the center thereof is in contact with the ground, and as the airplane moves the pontoons turn in the manner aforesaid, with one side of each pontoon on the ground and the other raised therefrom.

It will be understood, of course, that the present invention as hereinafter described and as shown in the accompanying drawings is susceptible to various changes and modifications which may be made from time to time without departing from the general principles or real spirit of the invention, and accordingly it is intended to claim the same broadly, as well as specifically, as indicated by the appended claims.

What is claimed as new and useful is:

1. A collapsible, displaceable aircraft pontoon assembly which may be inflated or deflated while the aircraft is in flight comprising, an inflatable float, a float-support structure and means securing said float thereto, a pressurized gas conduit system communicating with the interior of said float for conducting pressurized gas thereto from a gas supply whereby said float may be inflated for use, and means coupled to said float for deflating and collapsing the latter and spirally winding the same about the said float-support structure while the aircraft is in flight to provide a compact unit affording relatively small air drag.

2. A collapsible, displaceable aircraft pontoon assembly which may be inflated or deflated while the aircraft is in flight comprising, an inflatable float, a float-support structure and means securing said float thereto, a pressurized gas conduit system communicating with the interior of said float for conducting pressurized gas thereto from a gas supply whereby said float may be inflated for use, means coupled to said float for deflating and collapsing the latter while the aircraft is in flight into a compact unit affording relatively small air drag, said float-support structure including a member freely rotatable about a substantially vertically extending axis, said member being secured to said float by said float securing means in such a way that said float is rotatable in a substantially horizontal plane.

3. The pontoon assembly according to claim 2 further including brake means associated with said float-support structure and controllably engageable with said rotatable member, whereby the rotational speed of the float may be governed.

4. A rotatable, collapsible, displaceable aircraft pontoon assembly which may be inflated or deflated while the aircraft is in flight comprising, an inflatable float, a float-support structure and means securing said float thereto, a pressurized gas conduit system communicating with the interior of said float for conducting pressurized gas thereto from a gas supply whereby said float may be inflated for use, and means coupled to said float for deflating and collapsing the latter while the aircraft is in flight into a compact unit affording relatively small air drag, said float being substantially circular when viewed in plan and being ellipsoidal in vertical cross-section, the ellipsoid major axis lying in the plane of float rotation.

5. A collapsible, displaceable aircraft pontoon assembly which may be inflated or deflated while the aircraft is in flight comprising, an inflatable float, a float-support structure and means securing said float thereto, a pressurized gas conduit system communicating with the interior of said float for conducting pressurized gas thereto from a gas supply whereby said float may be inflated for use, and means coupled to said float for deflating and collapsing the latter while the aircraft is in flight into a compact unit affording relatively small air drag, said pressurized gas conduit system including an inlet chamber in communication with a source of gas under pressure, and a gas conduit connecting the interior of said float to said inlet chamber through a first check valve, said check valve opening under gas pressure to allow gas to pass from the gas source into the float and closing when the float gas pressure exceeds the gas pressure in the inlet chamber.

6. A collapsible, displaceable aircraft pontoon assembly which may be inflated or deflated while the aircraft is in flight comprising, an inflatable float, a float-support structure and means securing said float thereto, a pressurized gas conduit system communicating with the interior of said float for conducting pressurized gas thereto from a gas supply whereby said float may be inflated for use, and means coupled to said float for deflating and collapsing the latter while the aircraft is in flight into a compact unit affording relatively small air drag, said float includes a plurality of individual gas tight compartments and said pressurized gas conduit system comprising an inlet chamber in communication with a source of gas under pressure and a plurality of gas conduits each respectively connecting the interior of an individual float compartment through a check valve to said inlet chamber, said check valves opening under gas pressure to allow gas to pass from the gas source into the individual float compartments and closing when the float compartments' gas pressure exceeds the gas pressure in the inlet chamber.

7. The pontoon assembly according to claim 2 wherein said pressurized gas conduit system includes an inlet chamber in communication with a source of gas under pressure, and a gas conduit connecting the interior of said float to said inlet chamber through a first check valve, said check valve opening under gas pressure to allow gas to pass from the gas source into the float and closing when the float gas pressure exceeds the gas pressure in the inlet chamber.

8. The pontoon assembly according to claim 7 wherein said float-support rotatable member includes said check valve structure and the portion of said gas conduit between said check valve and said inlet chamber extends through said rotatable member.

9. The pontoon assembly according to claim 5 wherein said float deflating and collapsing means includes means for opening said first check valve against the force tending to hold the valve closed, and further means for connecting the inlet chamber to a pressure level below the float pressure level, whereby said float may be deflated.

10. The pontoon assembly according to claim 9 wherein said last named means includes a normally closed inlet chamber check valve and said means for opening said first check valve is also operative to simultaneously open said inlet chamber check valve, whereby the gas pressure in said float may be controllably reduced.

11. The pontoon assembly according to claim 9 wherein said float deflating and collapsing means includes means for wrapping the deflated float compactly about said float-support structure.

12. The pontoon assembly according to claim 11 wherein said last named wrapping means comprises a reel and a cable wound spirally about said float and also about said reel, said reel being freely rotatably connected to said float-support structure, and means for rotating said reel to wind the cable thereabout and thereby collapse the float by wrapping it compactly about the said float-support structure.

References Cited in the file of this patent

UNITED STATES PATENTS

| | | |
|---|---|---|
| 1,791,024 | Eller | Feb. 3, 1931 |
| 2,463,351 | Bowers | Mar. 1, 1949 |
| 2,621,874 | Boyle | Dec. 16, 1952 |
| 2,643,835 | Janney | June 30, 1953 |

FOREIGN PATENTS

| | | |
|---|---|---|
| 121,096 | Austria | Jan. 26, 1931 |
| 600,377 | Germany | July 21, 1934 |